United States Patent [19]

Stokes

[11] Patent Number: 4,903,987
[45] Date of Patent: Feb. 27, 1990

[54] ENERGY ABSORBING AUTOMOTIVE INSTRUMENT PANEL

[75] Inventor: Vijay K. Stokes, Schenectady, N.Y.

[73] Assignee: General Electric Company, Schenectady, N.Y.

[21] Appl. No.: 227,226

[22] Filed: Aug. 2, 1988

Related U.S. Application Data

[63] Continuation of Ser. No. 045,989, May 4, 1987, abandoned.

[51] Int. Cl.⁴ .................... B60K 37/00; B60R 21/045
[52] U.S. Cl. ..................................... 280/752; 296/70; 296/72; 180/90
[58] Field of Search ..................... 280/752, 753, 777; 180/90; 296/70, 72

[56] References Cited

U.S. PATENT DOCUMENTS

| | | |
|---|---|---|
| 3,341,248 | 9/1967 | Barenyi et al. ................... 180/90 |
| 3,521,724 | 7/1970 | Mayer ................................ 280/777 |
| 3,924,707 | 12/1975 | Renner et al. .................... 280/752 |
| 4,123,085 | 10/1978 | Cha et al. ......................... 280/752 |
| 4,347,276 | 8/1982 | Weber et al. ..................... 280/752 |
| 4,372,412 | 2/1983 | Fujii et al. ........................ 248/271 |
| 4,474,391 | 10/1984 | Matsuno et al. ................. 280/752 |
| 4,667,979 | 5/1987 | Wolff ................................ 280/752 |

Primary Examiner—Richard A. Bertsch
Attorney, Agent, or Firm—William H. Steinberg; James C. Davis, Jr.; Webb, II Paul R.

[57] ABSTRACT

An instrument panel for an automobile is provided comprising a beam member. The central portion of the beam is spaced away from the frame and is capable of flexing elastically in the transverse direction. A recoil restraint means is secured at one end intermediate the ends of the beam and is secured at the other end to the frame. The recoil restraint means permits motion of the beam in the transverse direction towards the frame but preventing motion away from the frame.

4 Claims, 6 Drawing Sheets

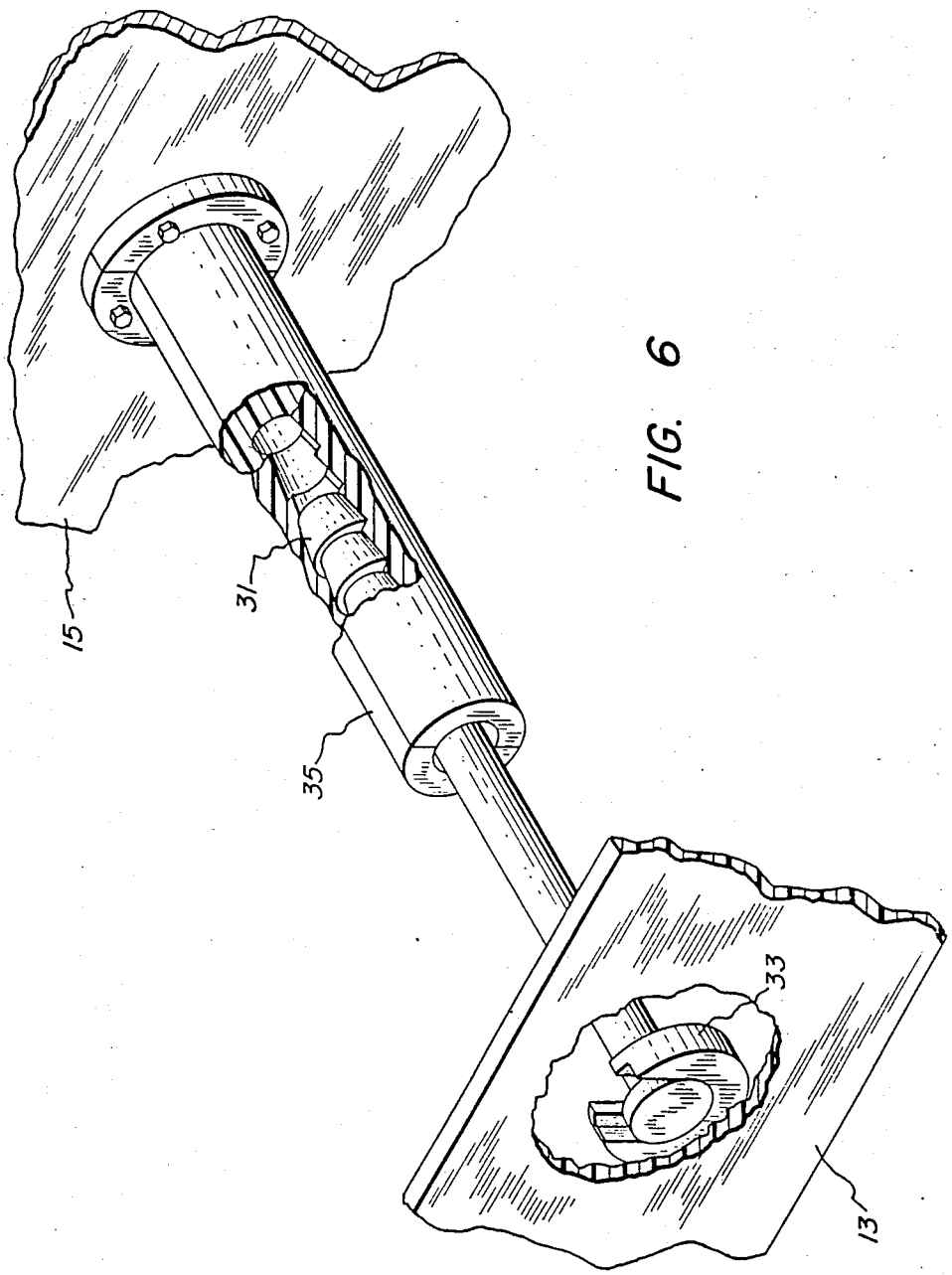

ENERGY ABSORBING AUTOMOTIVE INSTRUMENT PANEL

This application is a continuation of application Ser. No. 045,989, filed May 4, 1987, now abandoned.

BACKGROUND OF THE INVENTION

The present invention relates to energy absorbing automotive instrument panels.

More plastics are being used in automobile applications to reduce the cost and weight of the vehicle, and to take advantage of the stylistic freedoms provided by the material. Engineering plastics have the advantages of high strength, high temperature resistance and moldability. However, the strength characteristics of an engineered plastic instrument panel in a crash could cause a problem. After absorbing energy from the vehicle occupants impacting the dash during a crash, the deformed instrument panel can fling back the vehicle passengers resulting in injuries even though the passengers are restrained by seat belts. Metal dashboards permanently deform when absorbing energy during impact. It is difficult, however, to design a plastic dashboard to permanently deform while absorbing energy under the broad range of environmental conditions an automotive interior is subjected to.

It is an object of the present invention to provide an energy absorbing instrument panel of plastic material.

It is a further object of the present invention to provide an instrument panel which deforms elastically, absorbing energy and which does not recoil.

SUMMARY OF THE INVENTION

In one aspect of the present invention an instrument panel for use in a vehicle is provided. The instrument panel comprises a beam member supported at either end by the frame of the vehicle. The central portion of the beam is spaced away from the frame and is capable of flexing elastically in the transverse direction. A recoil restraint means is secured at one end intermediate to the ends of the beam and is secured at the other end to the frame. The recoil restraint means permits motion of the beam in the transverse direction towards the frame but prevents motion away from the frame.

BRIEF DESCRIPTION OF THE DRAWING

While the specification concludes with claims particularly pointing out and distinctly claiming the present invention, objects and advantages of the invention can be more readily ascertained from the following description of preferred embodiments when used in conjunction with the accompanying drawing in which:

FIG. 6 is partially cutaway isometric view of another embodiment of a recoil restraint mechanism in accordance with the present invention;

DETAILED DESCRIPTION OF THE INVENTION

Figure 1:
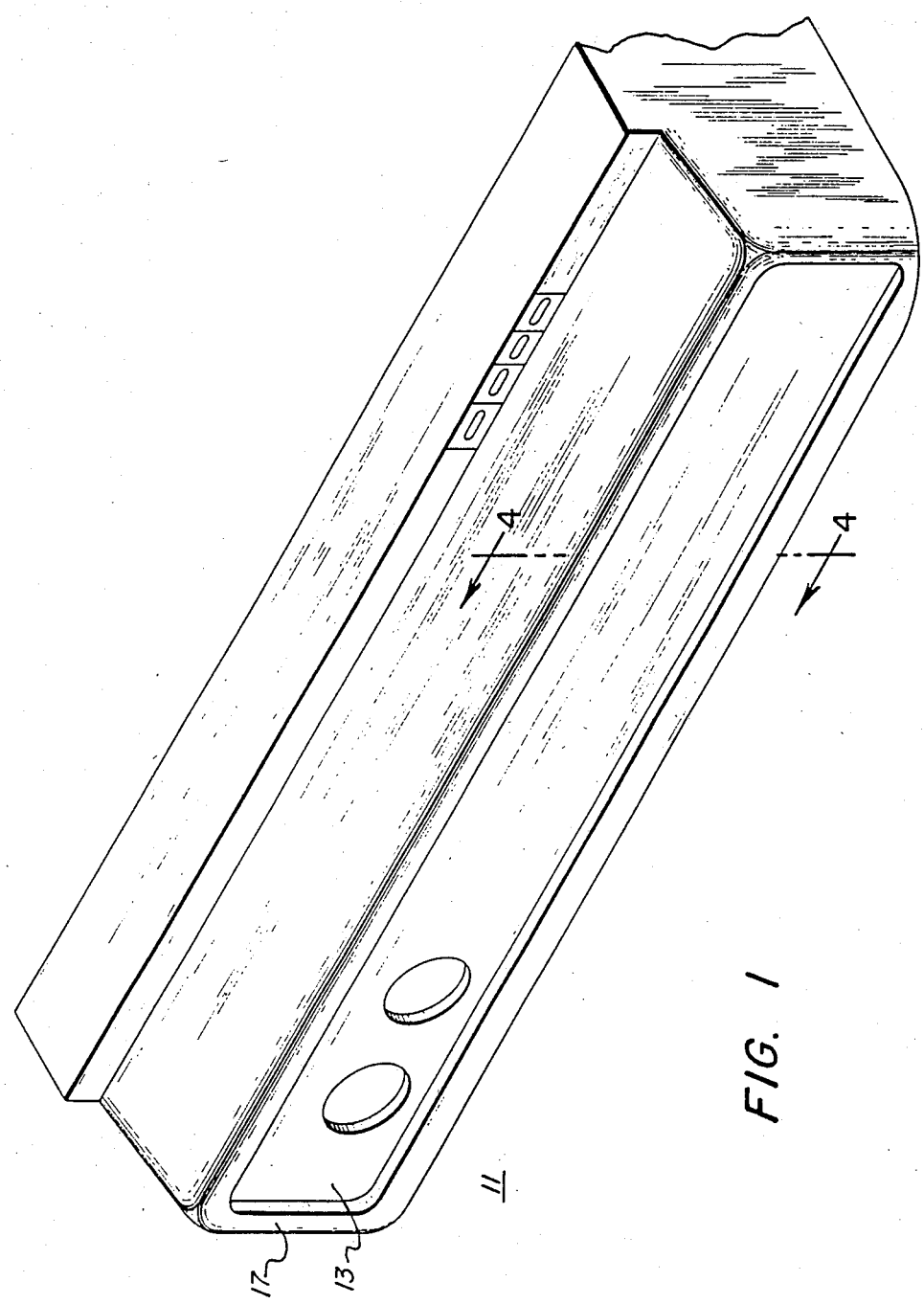
FIG. 1 is an isometric view of an instrument panel in accordance with the present invention.
Figure 2:
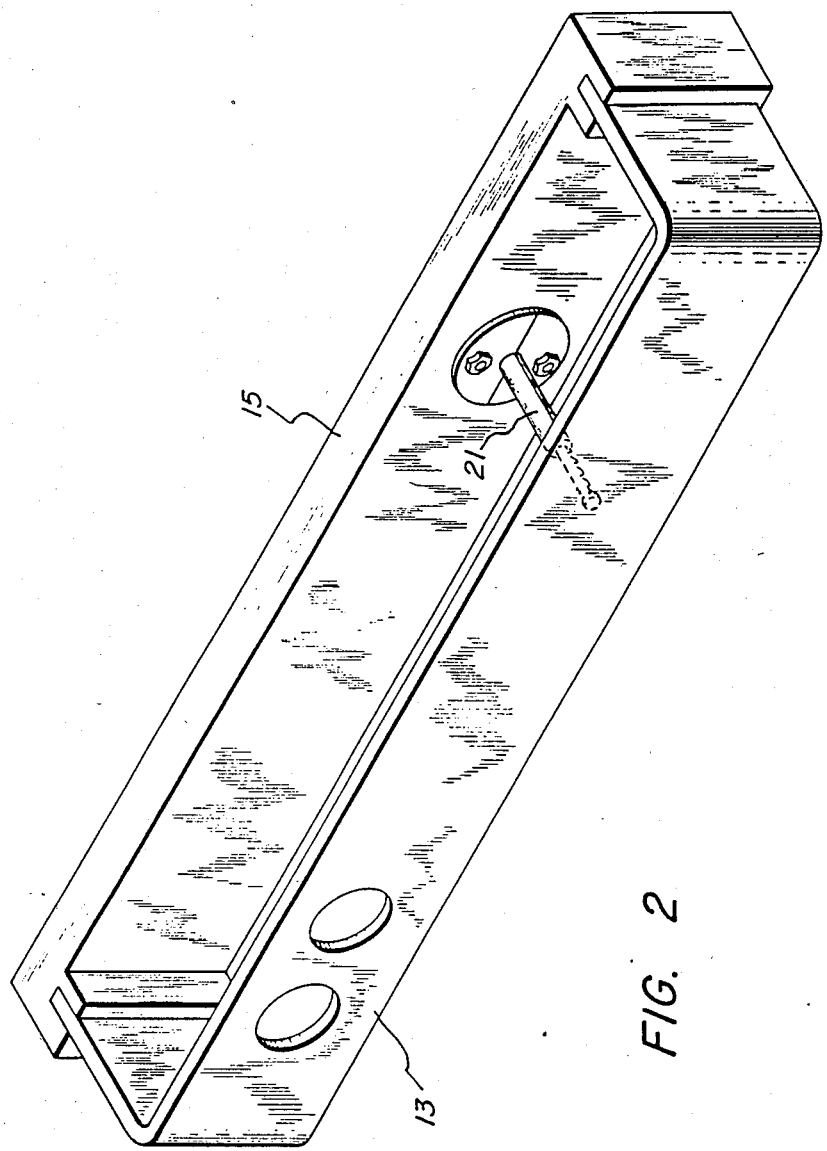
FIG. 2 is the instrument panel of FIG. 1 shown with the outer styled casing removed.

Referring now to the drawing wherein like numerals indicate like elements throughout and particularly FIG. 1 thereof, an automotive instrument panel 11 is shown. Referring to FIG. 2, a beam member 13 having curved ends extending perpendicularly away from the central portion of the beam are secured to a frame member 15 of the automobile such as the cowl top panel which spans the two front door pillars (not shown). The beam member 13 can flex elastically in the transverse direction. The frame member is typically fabricated of steel and provides rigid support of the curved beam ends. An outer styled casing 17 shown in FIG. 1, which can be fabricated of elastomeric material such as foam, encloses the top, bottom and sides of the instrument panel. A recoil restraint assembly 21, which can be seen in FIG. 2, is situated at an intermediate position along the beam 13 and is secured between the beam and the automotive structural frame member 15.

Figure 4:
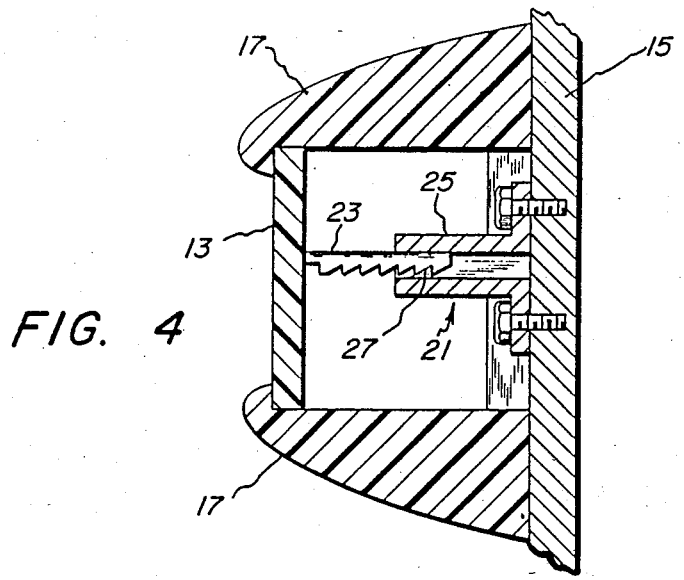
FIG. 4 is a cross-sectional view of the instrument panel along the lines 4—4 of FIG. 1.

Referring now to FIG. 4 the recoil restraint assembly 21 in one embodiment comprises ratchet 23 having the shape of a toothed bar, which is mounted on the beam member 13 and extends perpendicularly therefrom. The ratchet 23 extends into an opening in a stationary receiving member 25 mounted to the vehicle frame 15, such as by threaded fasteners, and extends perpendicularly thereto. The receiving member contains a spring biased pawl 27 which engages the teeth of the ratchet. The receiving member comprises two halves separated along a longitudinally extending plane.

Figure 3:
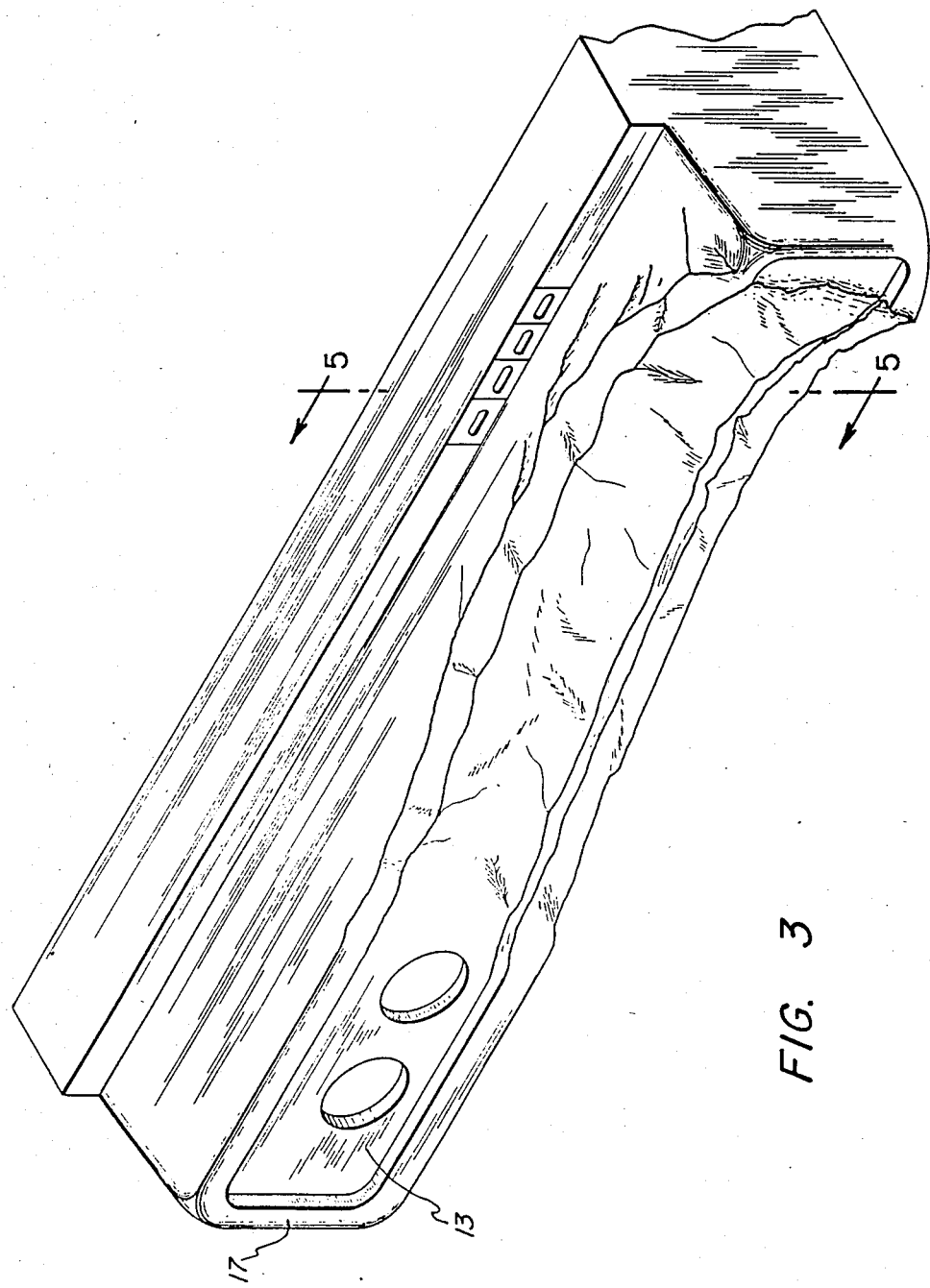
FIG. 3 is the instrument panel of FIG. 1 after impact.
Figure 5:
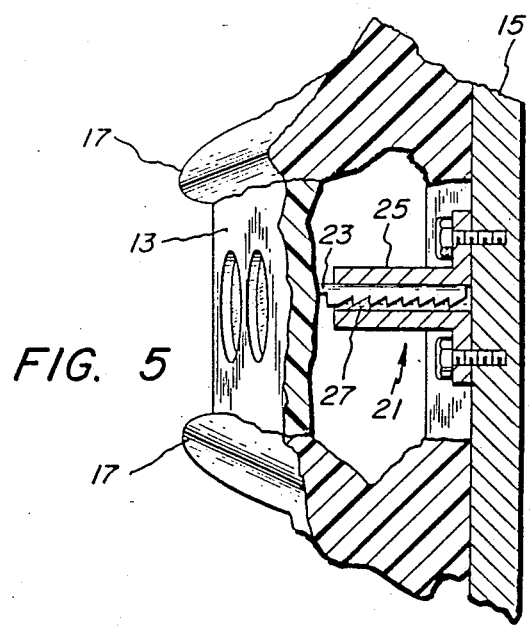
FIG. 5 is a cross-sectional view of the instrument panel along the lines 5—5 of FIG. 3.
Figure 8:
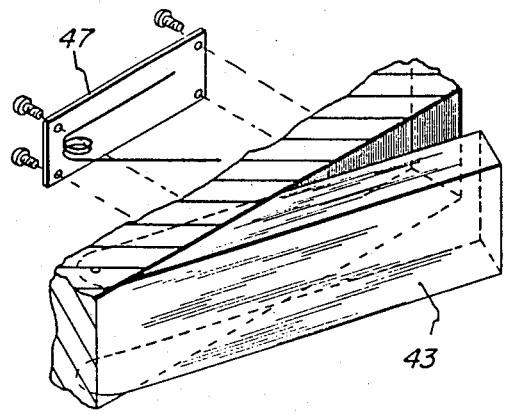
FIG. 8 is an isometric sectional view of just the pawl mechanism of FIG. 7.

When a vehicle passenger impacts the instrument panel during a collision, the strain energy absorbed during the elastic deflection of the beam member provides the mechanism for decelerating the body undergoing impact. Controlled deceleration can be used to limit the forces during impact and thereby reduce injury. The deflected shape of the beam member is shown in FIGS. 3 and 5. In order to provide a restraint against recoil, the ratchet 23 and pawl 27 provide an arresting action permitting the movement of the ratchet into the opening of the stationary member 25 but restraining motion in the opposite direction. The beam member 13 can be released by separating the two halves of the stationary member 25 which releases the pawl 27.

An alternative restraining device is shown in FIG. 6. A ratchet 31, having the shape of a plurality of truncated cones stacked along a rod which can be fabricated of metal or thermoplastic material, is secured intermediate the ends of the beam member by positioning a flanged end of the rod in a receiving slot. The receiving slot is created by securing a disk 33, having an undercut passageway to receive the flanged coil to the beam member. The disk 33 can be fabricated of metal or thermoplastic and secured by adhesive bonding. When the ratchet is pushed inside a stationary member 35 having a correspondingly mating shaped aperture during a collision the stationary member is fabricated from thermoplastic material in two halves separable along a longitudinal axis and secured to the frame such as by using threaded fasteners. The two halves of the stationary member can elastically flex outwards, pushing the arms outward in a clicking mode as the ratchet is driven further into the stationary member. The beam can be released by separating the two portions of the stationary member.

Figure 7:
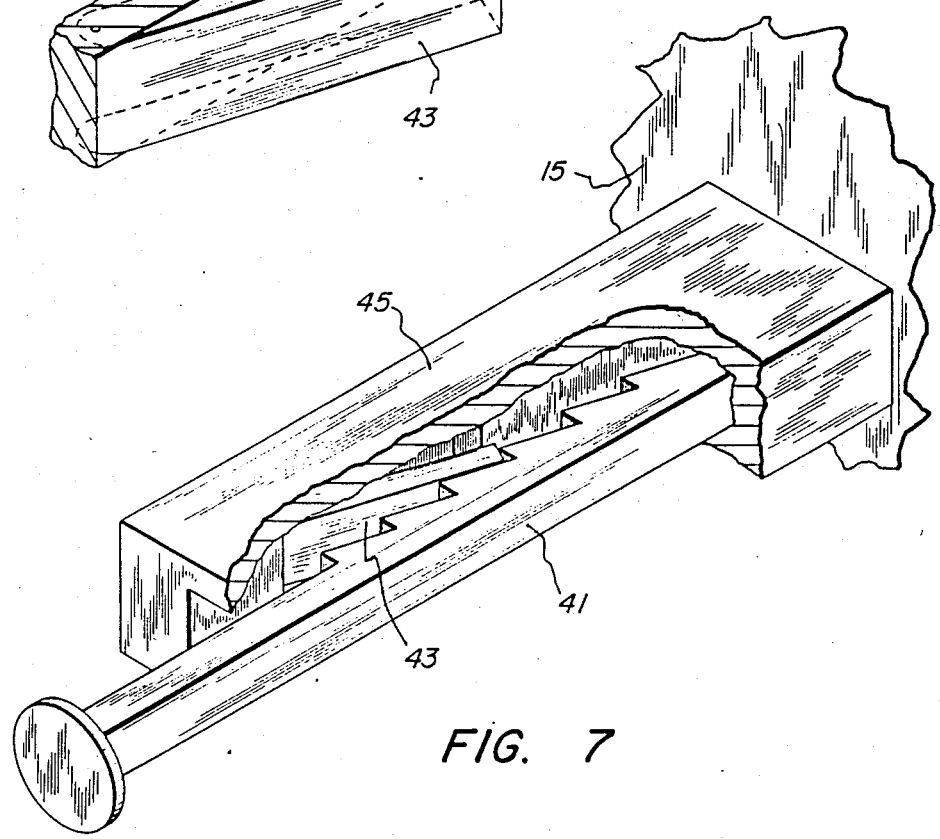
FIG. 7 is an isometric view of yet another embodiment of a recoil restraint mechanism; in accordance with the present invention.

Another restraining device is shown in FIG. 7 comprising a ratchet 44 having toothed bar and a spring loaded pawl 43. The toothed bar has a flanged at one end permitting mounting in a slot on the beam 13. The stationary receiving member 45 holds the spring loaded pawl 43. A plate 47 can be removed to release the pawl allowing the beam to return to its unflexed position during vehicle repair after the collision.

The foregoing describes an energy absorbing instrument panel of plastic material which deforms elastically, absorbing energy and which does not recoil.

While the invention has been described with respect to several preferred embodiments thereof, it will be apparent that certain modifications and changes can be made without departing from the spirit and scope of the invention. It is therefore to be understood that the appended claims are intended to cover all such modifications and changes as fall within the true spirit of the invention.

What is claimed is:

1. An instrument panel for use in a vehicle comprising:
   a beam member supported at either end by the frame of the vehicle, the central portion of the beam spaced away from the frame, said beam member flexing elastically in the transverse direction when impacted by a vehicle occupant; and
   recoil restrain means secured intermediate to the ends of said beam and secured to said frame for permitting motion of said beam in the transverse direction towards the frame when impacted and preventing transverse motion away from said frame so that said recoil restraint means stores the impact energy in said elastically flexed beam member.

2. The instrument panel of claim 1 wherein said beam member comprises thermoplastic material.

3. The instrument panel of claim 1 further comprising an outer casing of elastomeric material extending from the top and bottom of the beam to the frame.

4. The instrument panel of claim 1 wherein said recoil restraint means comprises a ratchet and pawl mechanism.

* * * * *